(12) United States Patent
Lin et al.

(10) Patent No.: US 9,077,109 B1
(45) Date of Patent: Jul. 7, 2015

(54) CARD CONNECTOR

(71) Applicant: Cheng Uei Precision Industry Co., Ltd., New Taipei (TW)

(72) Inventors: Kuo-Chin Lin, New Taipei (TW); Sheng Nan Yu, New Taipei (TW); Chih Hsien Chiang, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 14 days.

(21) Appl. No.: 14/142,742

(22) Filed: Dec. 27, 2013

(51) Int. Cl.
| H01R 13/635 | (2006.01) |
| H01R 13/50 | (2006.01) |
| H01R 13/6581 | (2011.01) |
| H01R 13/405 | (2006.01) |

(52) U.S. Cl.
CPC ............. *H01R 13/635* (2013.01); *H01R 13/50* (2013.01); *H01R 13/6581* (2013.01); *H01R 13/405* (2013.01)

(58) Field of Classification Search
CPC .. H01R 13/635; H01R 27/00; H01R 13/2442; G06K 7/0021; G06K 13/08; G06K 13/0806
See application file for complete search history.

(56) References Cited

U.S. PATENT DOCUMENTS

| 7,766,678 | B1 * | 8/2010 | Abe | 439/159 |
| 7,837,486 | B2 * | 11/2010 | Li | 439/159 |
| 8,371,866 | B1 * | 2/2013 | Su et al. | 439/159 |
| 8,740,635 | B2 * | 6/2014 | Lim et al. | 439/159 |
| 2008/0064239 | A1 * | 3/2008 | Li | 439/152 |
| 2012/0276780 | A1 * | 11/2012 | Hu et al. | 439/630 |
| 2013/0130527 | A1 * | 5/2013 | Lee et al. | 439/159 |
| 2014/0315404 | A1 * | 10/2014 | Wang et al. | 439/159 |

* cited by examiner

*Primary Examiner* — Gary Paumen
(74) *Attorney, Agent, or Firm* — Cheng-Ju Chiang

(57) ABSTRACT

A card connector includes an insulating housing, a plurality of conductive terminals integrally molded to the insulating housing, an ejection mechanism, a card tray slidably assembled to the insulating housing, and at least one restraining element restrained in one side of the card tray. The insulating housing includes a bottom wall, a first side wall, a second side wall, and a rear wall which defines a recess. The second side wall defines a sliding groove. A bottom surface of the sliding groove is concaved downward to form a heart-shaped tracking groove. The ejection mechanism includes a connecting element slidably disposed in the sliding groove, a push button, a guiding element slidably disposed in the sliding groove, a rotating element rotatably disposed in the recess and an elastic element. The push button is mounted to the connecting element and projects beyond a front surface of the insulating housing.

14 Claims, 6 Drawing Sheets

CARD CONNECTOR

BACKGROUND OF THE INVENTION

1. Field of the Invention

The present invention relates to a connector, and more particularly to a card connector.

2. The Related Art

With the development of the information industry, communication devices, such as mobile phones, are widely used in people's daily lives. The mobile phone need be equipped with an electronic card to realize the communication function, and the electronic card electrically connects with a circuit board of the mobile phone by virtue of a card connector. So the card connector is an essential component of the mobile phone.

In general, the card connector includes an insulating housing, a plurality of conductive terminals, an ejection mechanism, a card tray and a shielding shell. The insulating housing defines an insertion space penetrating through a top and a front thereof. The conductive terminals are integrally molded to the insulating housing. The ejection mechanism is assembled in one side of the insulating housing. The shielding shell is covered on the insulating housing. The card tray defines a receiving space therein, and is slidably inserted into the insertion space of the insulating housing.

In use, when the electronic card need be inserted in the card connector, the card tray is pushed rearward by an auxiliary tool to make the card tray push the ejection mechanism to move rearward, then the auxiliary tool is loosened to release the card tray, so that the ejection mechanism rebounds forward to eject the card tray out of the insertion space of the card connector. The card tray is pulled out from the insertion space of the card connector. So the electronic card is received in the receiving space of the card tray, and the card tray together with the electronic card is pushed rearward into the insertion space of the card connector. When the electronic card need be withdrawn from the card connector, the card tray is pushed rearward again by the auxiliary tool to make the card tray push the ejection mechanism to move rearward, then the auxiliary tool is loosened to release the card tray, so that the ejection mechanism rebounds forward to eject the card tray out of the insertion space of the card connector. The card tray is pulled out from the insertion space of the card connector. So the electronic card is taken out of the receiving space of the card tray.

However, in the process of the electronic card being inserted in or withdrawn from the card connector, the auxiliary tool is needed to assist in ejecting the card tray out of the insertion space of the card connector that brings an inconvenience to users on account of the users seldom carrying around the auxiliary tool with them.

SUMMARY OF THE INVENTION

An object of the present invention is to provide a card connector. The card connector includes an insulating housing, a plurality of conductive terminals, an ejection mechanism, a card tray and at least one restraining element. The insulating housing includes a bottom wall, a first side wall and a second side wall extended upward from two opposite sides of the bottom wall, and a rear wall extended upward from a rear end of the bottom wall and connected with the first side wall and the second side wall. An insertion space is surrounded among the bottom wall, the first side wall, the second side wall and the rear wall. The rear wall defines a recess passing through a top surface and a front surface thereof. A rear end of a substantial middle of the second side wall defines a sliding groove penetrating through a top and a front thereof and communicating with the recess. A rear end of a bottom surface of the sliding groove is concaved downward to form a heart-shaped tracking groove joined end to end. The conductive terminals are integrally molded to the bottom wall of the insulating housing. The ejection mechanism includes a connecting element slidably disposed in the sliding groove, a push button, a guiding element slidably disposed in the sliding groove, a rotating element rotatably disposed in the recess and an elastic element restrained between a rear inner surface of the second side wall and the connecting element. The guiding element has two protruding pillars. One protruding pillar is pivoted in the connecting element and the other protruding pillar is slidably disposed in the tracking groove. The push button is mounted to the front end of the connecting element and projects beyond a front surface of the insulating housing. One end of the rotating element is capable of rotating to the insertion space, and a rear surface of the rotating element abuts against the front surface of the rear wall for limiting the other end of the rotating element in the recess. The card tray is slidably assembled to the insertion space of the insulating housing. The restraining element is restrained in one side of the card tray.

As described above, in the process of the electronic card being inserted in or withdrawn from the card connector, the card tray is ejected out of the insertion space of the card connector by virtue of the ejection mechanism. So no auxiliary tool is needed to assist in ejecting the card tray out of the insertion space of the card connector so as to bring a convenience to users.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
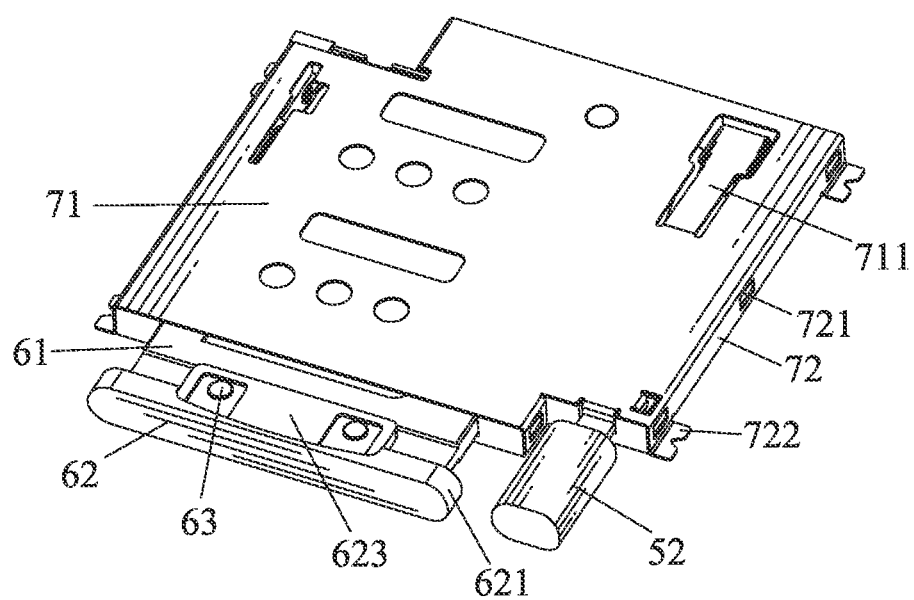
FIG. 1 is a perspective view of a card connector in accordance with an embodiment of the present invention.
Figure 2:
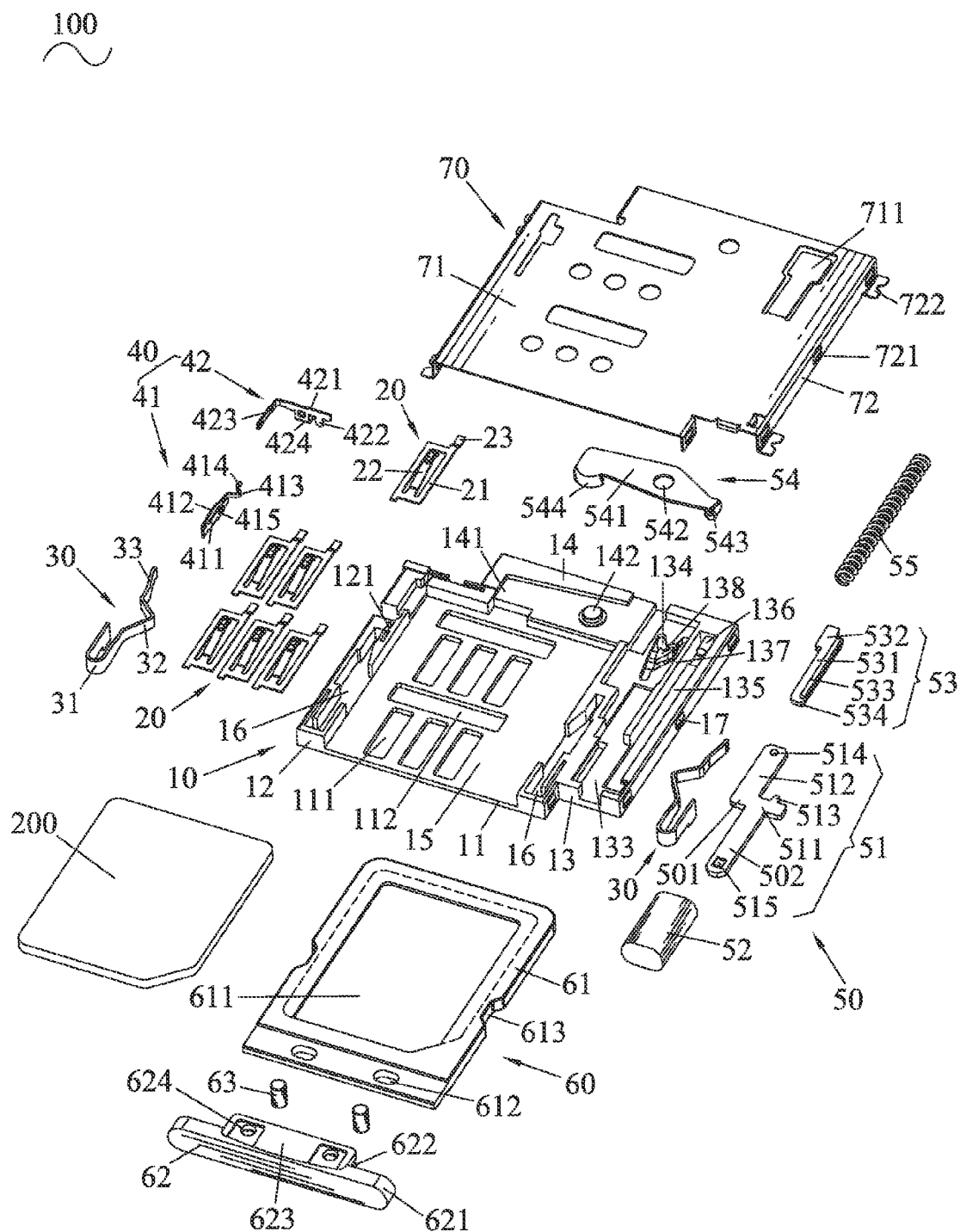
FIG. 2 is an exploded view of the card connector of FIG. 1.

With reference to FIG. 1 and FIG. 2, a card connector 100 in accordance with an embodiment of the present invention is shown. The card connector 100 for receiving an electronic card 200 therein, includes an insulating housing 10, a plurality of conductive terminals 20, at least one restraining element 30, a switch terminal assembly 40, an ejection mechanism 50, a card tray 60 for receiving the electronic card 200 therein, and a shielding shell 70. In this embodiment, the card connector 100 includes two restraining elements 30. In this embodiment, the card connector 100 includes two restraining elements 30.

Referring to FIG. 1, the insulating housing 10 includes a bottom wall 11 of a substantial rectangular shape, a first side wall 12 and a second side wall 13 extended upward from two opposite sides of the bottom wall 11, and a rear wall 14 extended upward from a rear end of the bottom wall 11 and connected with the first side wall 12 and the second side wall 13. An insertion space 15 is surrounded among the bottom wall 11, the first side wall 12, the second side wall 13 and the rear wall 14. The bottom wall 11 of the insulating housing 10 defines a plurality of first terminal holes 111 vertically penetrating therethrough and transversely arranged in two rows and a plurality of second terminal holes 112 vertically penetrating therethrough and transversely arranged in two rows. Each row of the second terminal holes 112 is spaced from and located in rear of one of the rows of the first terminal holes 111. Two front ends of the first side wall 12 and the second side wall 13 are concaved downward to form two lying U-shaped restraining grooves 16. The insulating housing 10 defines a lying L-shaped switch terminal groove 121 penetrating through a top surface and an outer surface of one end of the rear wall 14, and a top surface, an outer surface and an inner surface of a rear end of the first side wall 12 and communicating with the insertion space 15. The other end of the rear wall 14 of the insulating housing 10 defines a recess 141 passing through a top surface and a front surface thereof. A rear end of a substantial middle of the second side wall 13 defines a sliding groove 133 penetrating through a top and a front thereof, and communicating with the recess 141. A bottom surface of the recess 141 shows a step shape with one side thereof adjacent to the sliding groove 133 lower than the other side thereof. The bottom surface of the recess 141 protrudes upward to form a pivot pillar 142. A bottom surface of the sliding groove 133 shows a step shape. A front end of the bottom surface of the sliding groove 133 is lower than a rear end of the bottom surface of the sliding groove 133. The rear end of the bottom surface of the sliding groove 133 is concaved downward to form a heart-shaped tracking groove 134 joined end to end. A heart-shaped locking portion 138 is formed in the tracking groove 134 and is located apart from a periphery inside of the tracking groove 134. An outer side of the second side wall 13 of the insulating housing 10 is concaved downward to form a receiving trough 135. A rear end of one side of the bottom surface of the sliding groove 133 adjacent to the receiving trough 135 protrudes upward to form a blocking wall 137 located between the sliding groove 133 and the receiving trough 135. A front end of the sliding groove 133 communicates with a front end of the receiving trough 135. A rear inner surface of the receiving trough 135 of the second side wall 13 protrudes forward to form a first fastening pillar 136 projecting into the receiving trough 135. An outer periphery of the insulating housing 10 defines a plurality of buckling blocks 17.

Referring to FIG. 2, each of the conductive terminals 20 has a locating portion 21 of rectangular frame shape, a contact portion 22 slantwise extended upward and then arched upward from a front end of the locating portion 21, and a soldering portion 23 extended downward and then bent rearward from a rear end of the locating portion 21.

Referring to FIG. 2, each of the restraining elements 30 has a U-shaped fastening portion 31 with the mouth thereof being opened rearward, an elastic portion 32 arched outward from a free end of the fastening portion 31, and an extending portion 33 extended rearward from a rear end of the elastic portion 32.

Referring to FIG. 2, the switch terminal assembly 40 includes a touch terminal 41 and an inspecting terminal 42.

Referring to FIG. 2, the touch terminal 41 has a first base strip 411, a first connecting strip 412 protruded upward and then extended rearward from a front end of the first base strip 411, a resisting portion 413 arched inward from a free end of the first connecting strip 412, a first touching strip 414 extended rearward from a rear end of the resisting portion 413, and a first soldering strip 415 bent opposite to the resisting portion 413 from a bottom of the first base strip 411.

Referring to FIG. 2, the inspecting terminal 42 has a second base strip 421, a second extending strip 422 extended downward from a bottom of the second base strip 421, a second touching strip 423 extended forward from one end of the second base strip 421, and a second soldering strip 424 bent rearward from a bottom of the second extending strip 422 and spaced from the second extending strip 422.

Referring to FIG. 2, the ejection mechanism 50 includes a connecting element 51, a push button 52, a guiding element 53, a rotating element 54 and an elastic element 55. The connecting element 51 has a T-shaped pushing portion 511 disposed horizontally, and including a transverse portion 501 and a longitudinal portion 502 extended forward from a middle of the transverse portion 501, a linkage portion 512 extended rearward from one end of a rear of the transverse portion 501 and a second fastening pillar 513 protruded rearward from the other end of the rear of the transverse portion 501. A rear end of the linkage portion 512 of the connecting element 51 defines a second pivot hole 514. A front end of the longitudinal portion 502 defines a restricting portion 515. The push button 52 defines a restricting hole (not shown).

The guiding element 53 has a sliding block 531, a pushing block 532 extended sideward and then extended rearward from a rear end of the sliding block 531, a protruding rib 533 protruded upward from a top surface of the sliding block 531, and two protruding pillars 534 protruded downward from two opposite ends of a bottom surface of the sliding block 531. The rotating element 54 has a rotating portion 541 with a first pivot hole 542 being defined therein, a blocking portion 543 bent downward and then curved rearward from one end of the rotating portion 541, and an abutting portion 544 extended forward and then bent downward from the other end of the rotating portion 541.

The card tray 60 includes a rectangular base board 61, a front cover body 62 and two fixing pins 63. A substantially middle of the base board 61 defines a receiving space 611 for receiving the electronic card 200 therein. A front end of the base board 61 defines two through-holes 612. Two opposite sides of the base board 61 are concaved inward to form two cavities 613. The front cover body 62 has an elongated cover portion 621 which defines an insertion slot 622 penetrating through a rear thereof, and two clamping portions 623 extended rearward from a top and a bottom of an inner surface of a front sidewall of the insertion slot 622 and spaced from each other. Each clamping portion 623 defines two fixing holes 624. The front end of the base board 61 is inserted into the insertion slot 622 and clamped between the two clamping portions 623 with the two through-holes 612 corresponding to the two fixing holes 624 of the clamping portion 623 which is located above the base board 61, and the other two fixing holes 624 of the other clamping portion 623 which is located under the base board 61. The two fixing pins 63 respectively pass through the two fixing holes 624 of the clamping portion 623 which is located above the base board 61, the two through-holes 612, and the other two fixing holes 624 of the other clamping portion 623 which is located under the base board 61 to mount the front cover body 62 to the base board 61.

Referring to FIG. 2, the shielding shell 70 has a top plate 71, and two side plates 72 bent downward from two opposite sides of the top plate 71. The top plate 71 of the shielding shell 70 is punched downward to form a pressing tab 711. The two side plates 72 of the shielding shell 70 define a plurality of buckling holes 721. Two opposite ends of a bottom edge of the side plate 72 of the shielding shell 70 are bent outward to form two soldering feet 722.

Figure 3:
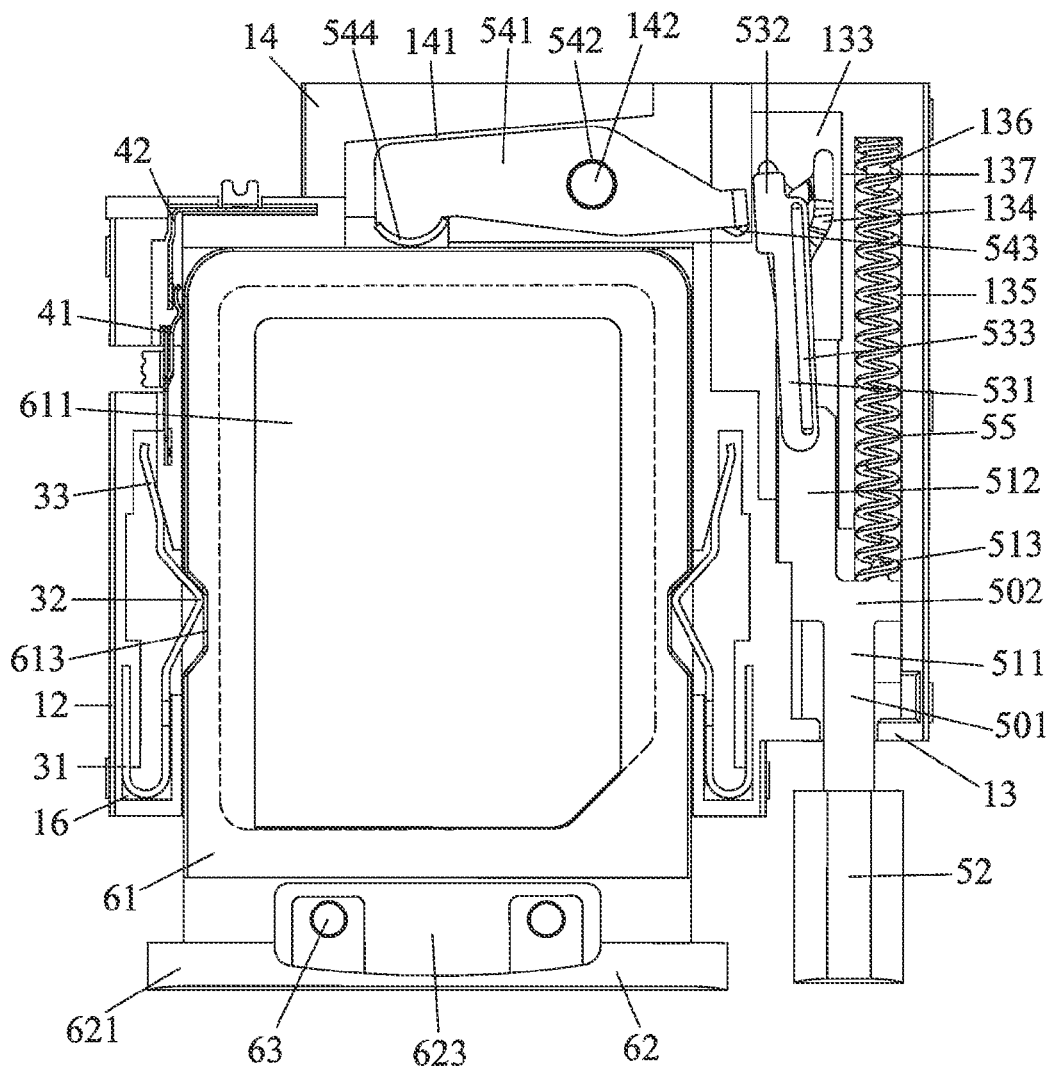
FIG. 3 is a perspective view showing a status of a card tray together with an electronic card being inserted into the card connector of FIG. 1.
Figure 4:
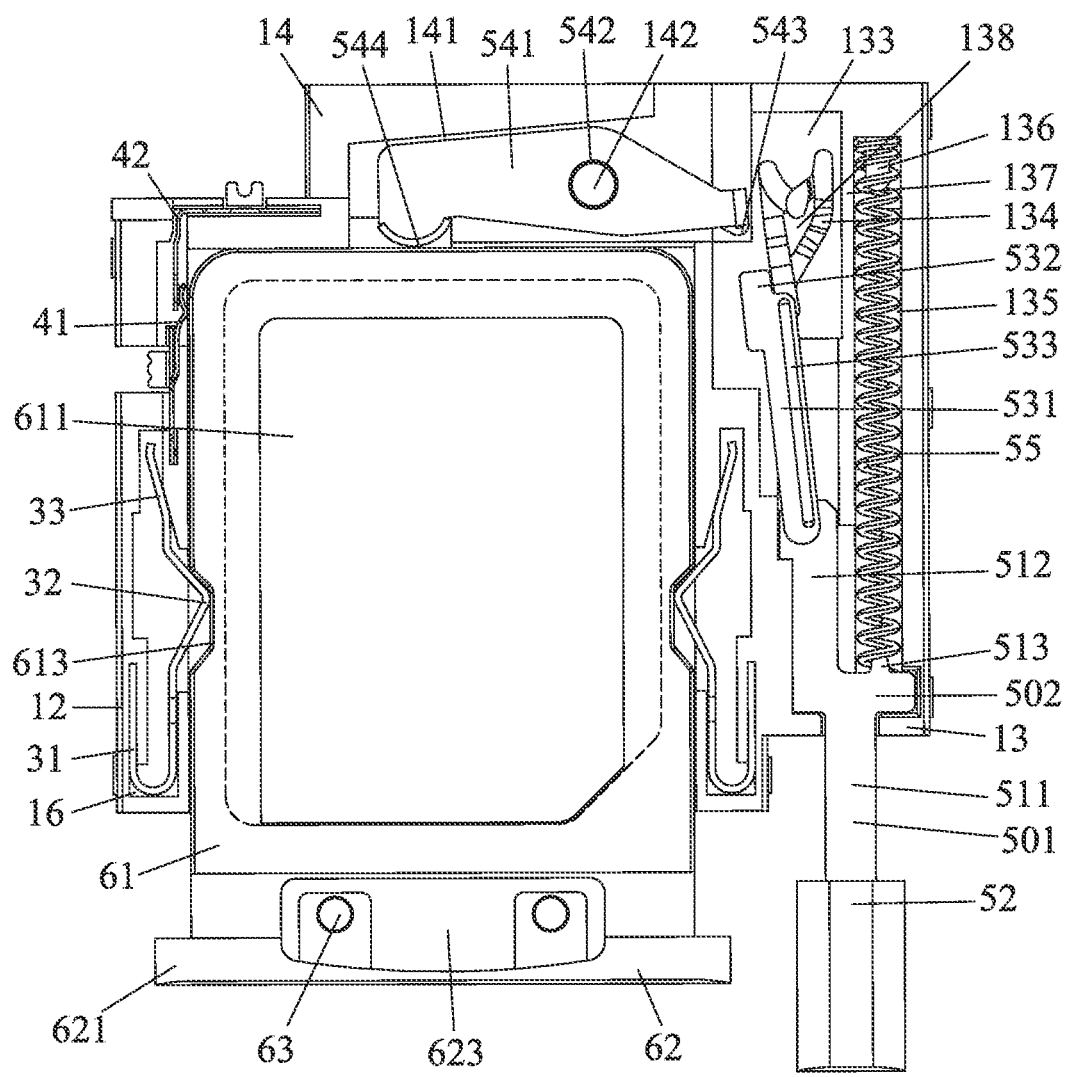
FIG. 4 is a perspective view showing another status of the card tray together with the electronic card being inserted into the card connector of FIG. 1.
Figure 5:
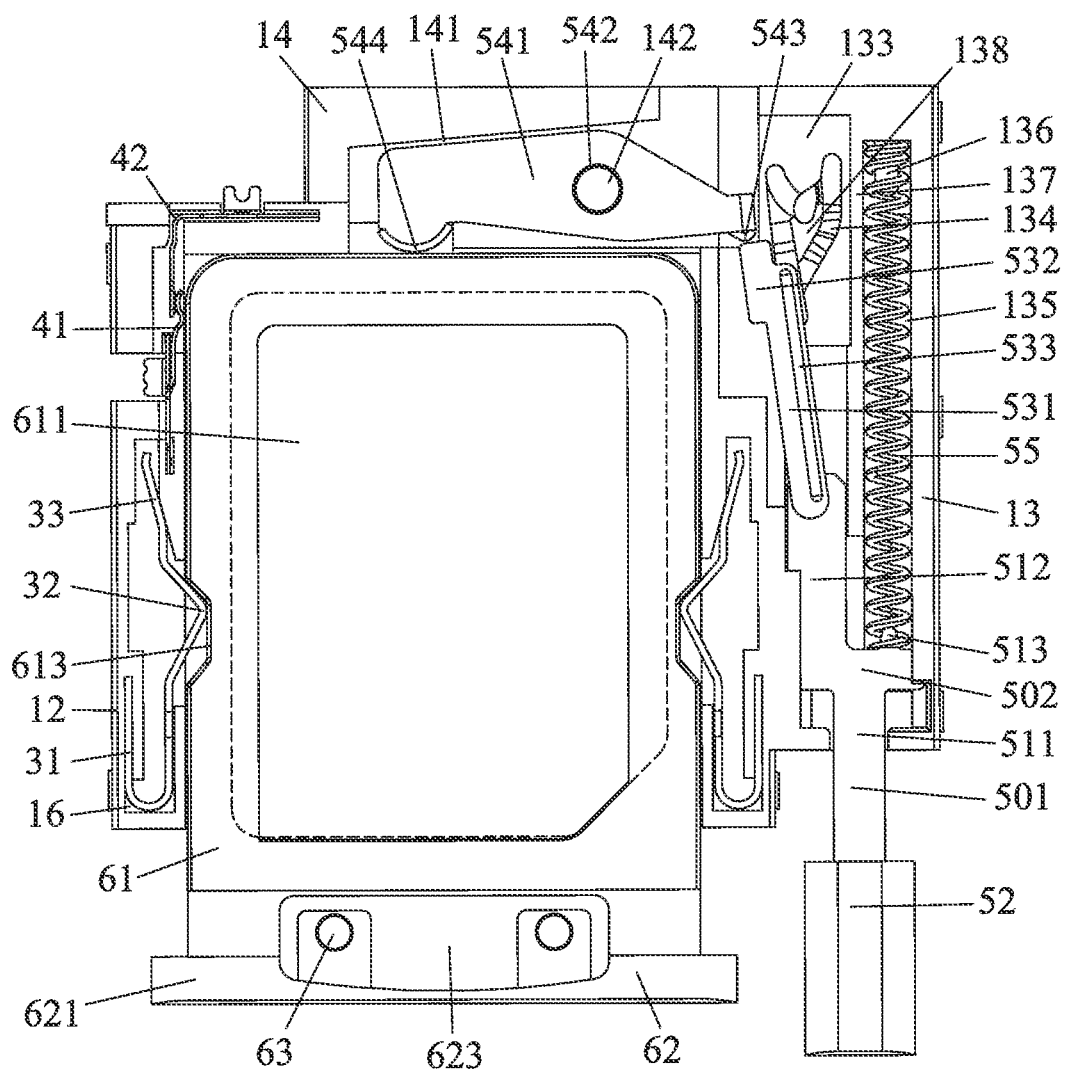
FIG. 5 is a perspective view showing a status of the card tray together with the electronic card being ejected out of the card connector of FIG. 1.
Figure 6:
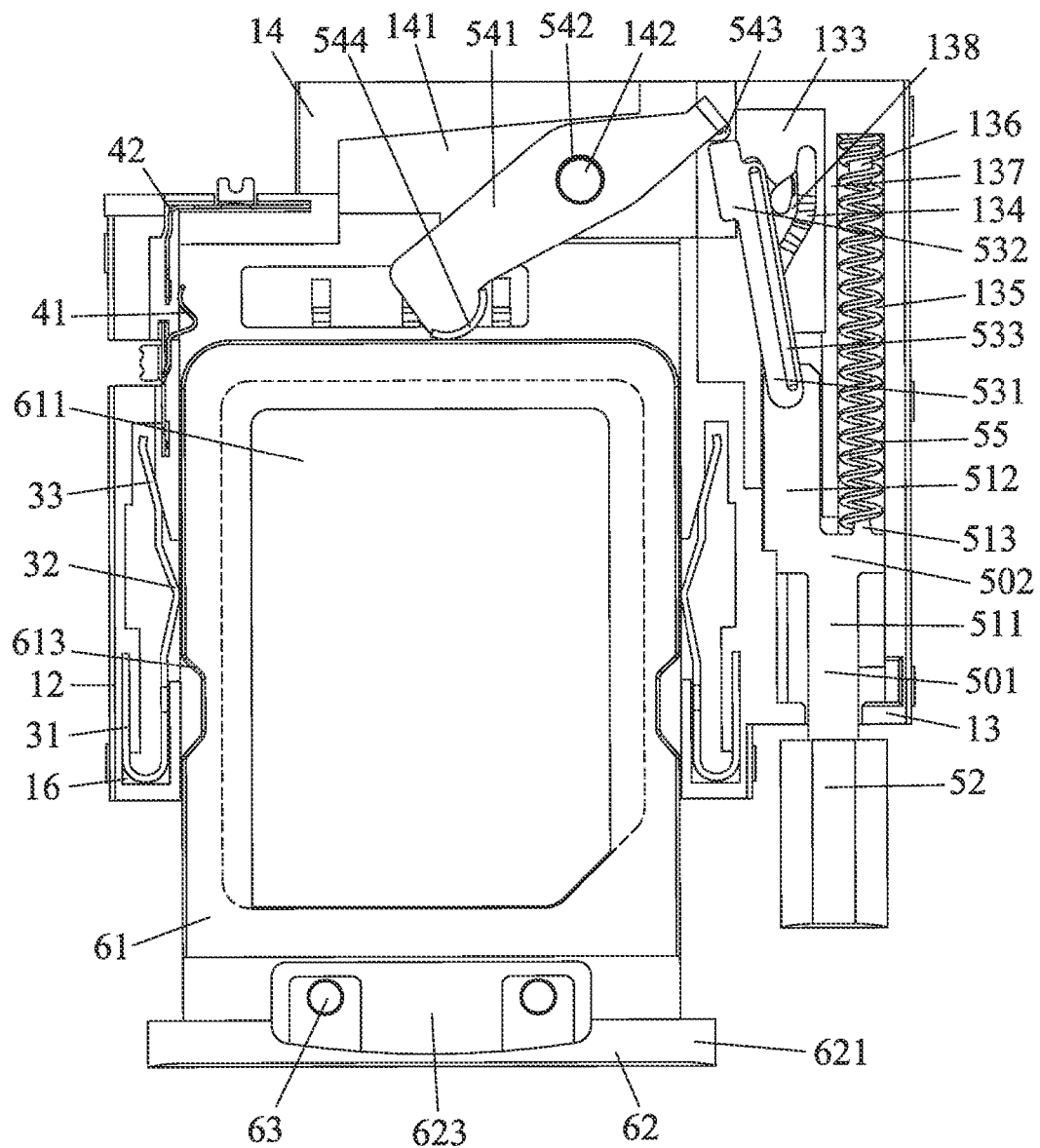
FIG. 6 is a perspective view showing another status of the card tray together with the electronic card being ejected out of the card connector of FIG. 1.

Referring to FIG. 1, FIG. 2 and FIG. 3, in assembly, the conductive terminals 20 are integrally molded to the bottom wall 11 of the insulating housing 10. The locating portion 21 of the conductive terminal 20 is located in the bottom wall 11 of the insulating housing 10, the contact portion 22 projects beyond a top surface of the bottom wall 11 to project into the insertion space 15 through the first terminal hole 111, and the soldering portion 23 projects into the second terminal hole 112. The two restraining elements 30 are restrained to the two restraining grooves 16 of the insulating housing 10. The fastening portion 31 and the extending portion 33 of the restraining element 30 are restrained in the restraining groove 16, and the elastic portion 32 projects into the insertion space 15 of the insulating housing 10. The touch terminal 41 is assembled to a front of the switch terminal groove 121 and the inspecting terminal 42 is assembled to a rear of the switch terminal groove 121. Specifically, the first base strip 411 and the first connecting strip 412 are assembled in the front of the switch terminal groove 121, the resisting portion 413 and the first touching strip 414 project into the insertion space 15, and a bottom of the first soldering strip 415 projects under the insulating housing 10. The second base strip 421, the second extending strip 422 and the second touching strip 423 are assembled in the rear of the switch terminal groove 121, a front end of the second touching strip 423 is located at an outer side of the first touching strip 414 to contact or depart from the first touching strip 414, and a bottom of the second soldering strip 424 projects under the insulating housing 10.

The ejection mechanism 50 is assembled to the insulating housing 10. The connecting element 51 is slidably disposed in the sliding groove 133 with the second fastening pillar 513 projecting into the receiving trough 135. The push button 52 is mounted to the front end of the connecting element 51 with the restricting portion 515 restricted in the restricting hole of the push button 52 and projecting beyond a front surface of the insulating housing 10. The guiding element 53 is slidably disposed in the sliding groove 133 with one protruding pillar 534 pivoted in the second pivot hole 514 of the connecting element 51 and the other protruding pillar 534 slidably disposed in the tracking groove 134. Push the push button 52 rearward to push the connecting element 51 to move rearward so as to make the connecting element 51 drive the protruding pillar 534 of the guiding element 53 which is pivoted in the second pivot hole 514 to slide in the tracking groove 134 until the protruding pillar 534 resists against the locking portion 138. The elastic element 55 is received in the receiving trough 135. One end of the elastic element 55 is worn around the first fastening pillar 136 and the other end of the elastic element 55 is worn around the second fastening pillar 513 of the connecting element 51 to restrain the elastic element 55 between the rear inner surface of the second side wall 13 and the connecting element 51. The rotating element 54 is rotatably disposed in the recess 141. The rotating portion 541 and the blocking portion 543 are disposed in the recess 141, and the blocking portion 543 is located on one side of the bottom surface of the recess 141 adjacent to the sliding groove 133. The pivot pillar 142 is pivoted in the first pivot hole 542. One end of the rotating element 54 in which the abutting portion 544 is defined, is capable of rotating to the insertion space 15. A rear surface of the abutting portion 544 of the rotating element 54 abuts against the front surface of the rear wall 14 for limiting the other end of the rotating element 54 in which the blocking portion 543 is defined, in the recess 141.

The card tray 60 is slidably assembled to the insertion space 15 of the insulating housing 10. The two elastic portions 32 of the two restraining elements 30 are restrained in the two cavities 613 of the base board 61 of the card tray 60.

The shielding shell 70 is covered on the insulating housing 10. The buckling blocks 17 of the insulating housing 10 are buckled in the buckling holes 721 of the shielding shell 70. The pressing tab 711 presses down upon the protruding rib 533 of the guiding element 53 of the ejection mechanism 50 for assuring the protruding pillar 534 of the guiding element 53 to stably slide in the tracking groove 134. At last, the soldering portions 23 of the conductive terminals 20, the first soldering strip 415 of the touch terminal 41 and the second soldering strip 424 of the inspecting terminal 42, and the soldering feet 722 of the shielding shell 70 are soldered to a circuit board (not shown) of a communication device (not shown).

Referring to FIG. 1 to FIG. 6, in use, when the electronic card 200 need be inserted in the card connector 100, push the push button 52 rearward to push the connecting element 51 to move rearward so as to make the connecting element 51 drive the protruding pillar 534 of the guiding element 53 to slide rearward and towards the blocking wall 137 to break away from the locking portion 138. At the moment, the elastic element 55 shows a compressing status to accumulate elastic potential energies. Release the push button 52, the elastic element 55 releases the elastic potential energies to elastically push the connecting element 51 with the push button 52 to move forward and the connecting element 51 drive the protruding pillar 534 of the guiding element 53 to slide forward until the transverse portion 501 of the pushing portion 511 abuts against two opposite sides of an inner surface of a front sidewall of the sliding groove 133. At the moment, the pushing portion 511 with the push button 52 projects out of the insulating housing 10.

Then, push the push button 52 rearward again to push the connecting element 51 to move rearward so as to make the connecting element 51 drive the protruding pillar 534 of the guiding element 53 to slide rearward and towards recess 141, the pushing block 532 of the guiding element 53 pushes against the blocking portion 543 of the rotating element 54 to make the rotating element 54 to rotate anticlockwise pivoting the pivot pillar 142 so that the abutting portion 544 projects into the insertion space 15 for pushing against the card tray 60 to move forward, at the moment, the two elastic portions 32 break away from the two cavities 613 of the card tray 60, so the card tray 60 is ejected out of the insertion space 15 of the card connector 100. Release the push button 52, the elastic element 55 releases the elastic potential energies to elastically push the connecting element 51 with the push button 52 to move forward and the connecting element 51 drive the protruding pillar 534 of the guiding element 53 to slide rearward and towards the blocking wall 137 until the protruding pillar 534 resists against the locking portion 138.

At last, pull out the card tray 60, the electronic card 200 is received in the receiving space 611 of the card tray 60, push the card tray 60 together with the electronic card 200 therein into the insertion space 15. The card tray 60 pushes against the abutting portion 544 of the rotating element 54 to move rearward so as to drive the rotating element 54 to rotate clockwise to be located in the recess 141. At least one restraining element 30 is restrained in one side of the card tray 60. The elastic portions 32 of the restraining elements 30 are restrained in the two cavities 613 of the base board 61 of the card tray 60.

Referring to FIG. 1 to FIG. 6, when the electronic card 200 need be withdrawn from the card connector 100, push the push button 52 rearward to push the connecting element 51 to move rearward so as to make the connecting element 51 drive the protruding pillar 534 of the guiding element 53 to slide rearward and towards the blocking wall 137 to break away from the locking portion 138. At the moment, the elastic element 55 shows a compressing status to accumulate elastic potential energies. Release the push button 52, the elastic element 55 releases the elastic potential energies to elastically push the connecting element 51 with the push button 52 to move forward and the connecting element 51 drive the protruding pillar 534 of the guiding element 53 to slide forward until the transverse portion 501 of the pushing portion 511 abuts against two opposite sides of an inner surface of a front sidewall of the sliding groove 133. At the moment, the pushing portion 511 with the push button 52 projects out of the insulating housing 10.

Then, push the push button 52 rearward again to push the connecting element 51 to move rearward so as to make the connecting element 51 drive the protruding pillar 534 of the guiding element 53 to slide rearward and towards recess 141, the pushing block 532 of the guiding element 53 pushes against the blocking portion 543 of the rotating element 54 to make the rotating element 54 to rotate anticlockwise pivoting the pivot pillar 142 so that the abutting portion 544 projects into the insertion space 15 for pushing against the card tray 60 together with the electronic card 200 therein to move forward, at the moment, the two elastic portions 32 break away from the two cavities 613 of the card tray 60 together with the electronic card 200 therein, so the card tray 60 together with the electronic card 200 therein is ejected out of the insertion space 15 of the card connector 100. Pull out the card tray 60 together with the electronic card 200 therein, and take the electronic card 200 out from the receiving space 611 of the card tray 60.

Release the push button 52, the elastic element 55 releases the elastic potential energies to elastically push the connecting element 51 with the push button 52 to move forward and the connecting element 51 drive the protruding pillar 534 of the guiding element 53 to slide rearward and towards the blocking wall 137 until the protruding pillar 534 resists against the locking portion 138.

As described above, in the process of the electronic card 200 being inserted in or withdrawn from the card connector 100, the card tray 60 is ejected out of the insertion space 15 of the card connector 100 by virtue of the ejection mechanism 50. So no auxiliary tool is needed to assist in ejecting the card tray 60 out of the insertion space 15 of the card connector 100 so as to bring a convenience to users.

What is claimed is:

1. A card connector, comprising:
   an insulating housing including a bottom wall, a first side wall and a second side wall extended upward from two opposite sides of the bottom wall, and a rear wall extended upward from a rear end of the bottom wall and connected with the first side wall and the second side wall, an insertion space being surrounded among the bottom wall, the first side wall, the second side wall and the rear wall, the rear wall defining a recess passing through a top surface and a front surface thereof, a rear end of a substantial middle of the second side wall defining a sliding groove penetrating through a top and a front thereof and communicating with the recess, a rear end of a bottom surface of the sliding groove being concaved downward to form a heart-shaped tracking groove joined end to end;
   a plurality of conductive terminals integrally molded to the bottom wall of the insulating housing;
   an ejection mechanism including a connecting element slidably disposed in the sliding groove, a push button, a guiding element slidably disposed in the sliding groove, a rotating element rotatably disposed in the recess and an elastic element restrained between a rear inner surface of the second side wall and the connecting element, the guiding element having two protruding pillars, one protruding pillar being pivoted in the connecting element and the other protruding pillar slidably disposed in the tracking groove, the push button mounted to the front end of the connecting element and projecting beyond a front surface of the insulating housing, one end of the rotating element being capable of rotating to the insertion space, and a rear surface of the rotating element abutting against the front surface of the rear wall for limiting the other end of the rotating element in the recess;
   a card tray being slidably assembled to the insertion space of the insulating housing; and
   at least one restraining element being restrained in one side of the card tray.

2. The card connector as claimed in claim 1, wherein an outer side of the second side wall of the insulating housing is concaved downward to form a receiving trough, the elastic element is received in the receiving trough.

3. The card connector as claimed in claim 2, wherein a rear end of one side of the bottom surface of the sliding groove adjacent to the receiving trough protrudes upward to form a blocking wall located between the sliding groove and the receiving trough, the connecting element has a T-shaped pushing portion disposed horizontally, and including a transverse portion and a longitudinal portion extended forward from a middle of the transverse portion, push the push button rearward to push the connecting element to move rearward to elastically push the connecting element with the push button to move forward until the transverse portion of the pushing portion abuts against two opposite sides of an inner surface of a front sidewall of the sliding groove.

4. The card connector as claimed in claim 3, wherein the connecting element includes a second fastening pillar protruded rearward from the other end of the rear of the transverse portion, the connecting element is slidably disposed in the sliding groove with the second fastening pillar projecting into the receiving trough.

5. The card connector as claimed in claim 1, wherein a heart-shaped locking portion is formed in the tracking groove and is located apart from a periphery inside of the tracking groove, the guiding element has a sliding block, and two protruding pillars protruded downward from two opposite ends of a bottom surface of the sliding block, the connecting element has a linkage portion extended rearward from one end of a rear of the transverse portion, a rear end of the linkage portion defines a second pivot hole, the guiding element is slidably disposed in the sliding groove with one protruding pillar pivoted in the second pivot hole, the connecting element drives the protruding pillar of the guiding element which is pivoted in the second pivot hole to slide in the tracking groove until the protruding pillar resists against the locking portion.

6. The card connector as claimed in claim 1, wherein the rotating element has a rotating portion with a first pivot hole being defined therein, a blocking portion bent downward and then curved rearward from one end of the rotating portion, and an abutting portion extended forward and then bent downward from the other end of the rotating portion, the guiding element has a sliding block, and a pushing block extended sideward and then extended rearward from a rear end of the sliding block, the rotating portion and the blocking portion are disposed in the recess, and the blocking portion is located on one side of a bottom surface of the recess adjacent to the sliding groove, the pushing block of the guiding element pushes against the blocking portion of the rotating element to make the rotating element to rotate so that the abutting portion projects into the insertion space for pushing against the card tray to move forward.

7. The card connector as claimed in claim 6, wherein the rear wall of the insulating housing defines a recess passing through a top surface and a front surface thereof, the bottom surface of the recess protrudes upward to form a pivot pillar, the rotating element has a rotating portion with a first pivot hole being defined therein, the pivot pillar is pivoted in the first pivot hole.

8. The card connector as claimed in claim 1, wherein two front ends of the first side wall and the second side wall of the insulating housing are concaved downward to form two lying U-shaped restraining grooves, the card connector includes two restraining elements restrained to the two restraining grooves, each of the restraining elements has a U-shaped fastening portion with the mouth thereof being opened rearward, and an elastic portion arched outward from a free end of the fastening portion, the card tray includes a base board, two opposite sides of the base board are concaved inward to form two cavities, the two elastic portions of the two restraining elements are restrained in the two cavities.

9. The card connector as claimed in claim 1, further including a shielding shell having a top plate, and two side plates being bent downward from two opposite sides of the top plate, the top plate of the shielding shell being punched downward to form a pressing tab, a protruding rib protruded upward from a top surface of the sliding block, the pressing tab presses down upon the protruding rib of the guiding element of the ejection mechanism for assuring the protruding pillar of the guiding element to stably slide in the tracking groove.

10. The card connector as claimed in claim 9, wherein two side plates of the shielding shell defines a plurality of buckling holes, an outer periphery of the insulating housing defines a plurality of buckling blocks, the buckling blocks of the insulating housing are buckled in the buckling holes of the shielding shell.

11. The card connector as claimed in claim 9, wherein two opposite ends of a bottom edge of the side plate of the shielding shell is bent outward to form two soldering feet.

12. The card connector as claimed in claim 1, wherein the bottom wall of the insulating housing defines a plurality of first terminal holes vertically penetrating therethrough and transversely arranged in two rows and a plurality of second terminal holes vertically penetrating therethrough and transversely arranged in two rows, each row of the second terminal holes is spaced from and located in rear of one of the rows of the first terminal holes, each of the conductive terminal has a locating portion, a contact portion slantwise extended upward and then arched upward from a front end of the locating portion, and a soldering portion extended downward and then bent rearward from a rear end of the locating portion, the locating portion is located in the bottom wall of the insulating housing, the contact portion projects beyond a top surface of the bottom wall of the insulating housing to project into the insertion space through the first terminal hole, and the soldering portion projects into the second terminal hole.

13. The card connector as claimed in claim 1, wherein the card tray further includes a front cover body and two fixing pins, a substantially middle of the base board defines a receiving space, a front end of the base board defines two through-holes, the front cover body has a cover portion which defines an insertion slot penetrating through a rear thereof, and two clamping portions extended rearward from a top and a bottom of an inner surface of a front sidewall of the insertion slot and spaced from each other, each clamping portion defines two fixing holes, the front end of the base board is inserted into the insertion slot and clamped between the two clamping portions with the two through-holes corresponding to the two fixing holes of the clamping portion which is located above the base board, and the other two fixing holes of the other clamping portion which is located under the base board, the two fixing pins respectively pass through the two fixing holes of the clamping portion which is located above the base board, the two through-holes, and the other two fixing holes of the other clamping portion which is located under the base board to mount the front cover body to the base board.

14. The card connector as claimed in claim 1, further including a switch terminal assembly including a touch terminal and an inspecting terminal, the touch terminal having a first base strip, a first connecting strip protruded upward and then extended rearward from a front end of the first base strip, a resisting portion arched inward from a free end of the first connecting strip, and a first touching strip extended rearward from a rear end of the resisting portion, the inspecting terminal having a second base strip, a second extending strip being extended downward from a bottom of the second base strip, and a second touching strip being extended forward from one end of the second base strip, the insulating housing defining a switch terminal groove communicating with the insertion space, the touch terminal being assembled to a front of the switch terminal groove and the inspecting terminal being assembled to a rear of the switch terminal groove, the first touching strip projecting into the insertion space, and the second touching strip being assembled in the rear of the switch terminal groove, a front end of the second touching strip is located at an outer side of the first touching strip to contact or depart from the first touching strip.

* * * * *